United States Patent
Jang (10) Patent No.: US 9,357,456 B2
(45) Date of Patent: May 31, 2016

(54) HANDOVER CONTROL METHOD AND APPARATUS FOR HIGH SPEED MOBILITY USER EQUIPMENT

(71) Applicant: Ke-Chi Jang, Plano, TX (US)

(72) Inventor: Ke-Chi Jang, Plano, TX (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 180 days.

(21) Appl. No.: 14/293,093

(22) Filed: Jun. 2, 2014

(65) Prior Publication Data

US 2015/0350978 A1 Dec. 3, 2015
US 2016/0073307 A9 Mar. 10, 2016

Related U.S. Application Data

(60) Provisional application No. 61/830,251, filed on Jun. 3, 2013.

(51) Int. Cl.
*H04W 36/00* (2009.01)
*H04W 36/32* (2009.01)
*H04W 36/04* (2009.01)

(52) U.S. Cl.
CPC .......... *H04W 36/0094* (2013.01); *H04W 36/32* (2013.01); *H04W 36/04* (2013.01)

(58) Field of Classification Search
CPC . H04W 36/0094; H04W 36/32; H04W 36/04; H04W 36/00; H04W 36/16; H04W 36/24; H04W 36/34; H04W 36/14; H04W 36/36; H04W 36/0083; H04W 36/0016; H04W 36/0005
See application file for complete search history.

(56) References Cited

U.S. PATENT DOCUMENTS

| | | | | |
|---|---|---|---|---|
| 5,239,667 A * | 8/1993 | Kanai | .................. | H04W 36/30 455/10 |
| 6,014,566 A * | 1/2000 | Owada | .................. | H04W 16/32 455/444 |
| 7,054,635 B1 * | 5/2006 | Ritzen | .................. | H04W 16/08 455/444 |
| 2001/0006514 A1 * | 7/2001 | Park | .................. | H04W 36/12 370/331 |
| 2005/0020203 A1 * | 1/2005 | Losh | .................. | H04B 1/7097 455/11.1 |
| 2005/0130662 A1 * | 6/2005 | Murai | .................. | H04J 11/004 455/444 |
| 2007/0032237 A1 * | 2/2007 | Chang | .............. | H04W 36/0083 455/436 |
| 2008/0305801 A1 * | 12/2008 | Burgess | .............. | H04W 36/04 455/444 |

(Continued)

OTHER PUBLICATIONS

Alcatel-Lucent. UE speed-based methods and mobility state estimation for improving the mobility performance in HetNets. 3GPP Draft; R2-121707.3rd Generation Partnership Project (3GPP), Mobile Competence Centre; 650, Route Des Lucioles ; F-06921 Sophia-Antipolis Cedex ; France, vol. RAN WG2, no. Jeju Island, Korea; Mar. 20, 2012.

(Continued)

*Primary Examiner* — Meless Zewdu (57) ABSTRACT

A handover control method and apparatus for limiting handover of a User Equipment (UE) from a macrocell to an underlying small cell when the UE is operating in a High Speed Mobility (HSM) mode in a radio access network. The UE receives an HSM pilot strength threshold offset parameter from the network and initiates handover from a macrocell to an underlying small cell using a first pilot strength threshold value when the UE is operating in a standard mode. The UE initiates the handover using a second pilot strength threshold value when the UE is operating in HSM mode. The second pilot strength threshold value is equal to the first pilot strength threshold value modified by the HSM pilot strength threshold offset parameter.

31 Claims, 8 Drawing Sheets

(56) References Cited

U.S. PATENT DOCUMENTS

| | | | |
|---|---|---|---|
| 2011/0250891 A1* | 10/2011 | Zou | H04W 36/04 455/437 |
| 2012/0108252 A1* | 5/2012 | Dimou | H04W 36/32 455/450 |
| 2013/0023302 A1 | 1/2013 | Sivanesan et al. | |
| 2013/0045749 A1* | 2/2013 | Sridhar | H04W 36/0083 455/443 |
| 2013/0084842 A1* | 4/2013 | Laitinen | H04W 36/32 455/418 |
| 2014/0045505 A1* | 2/2014 | Henry | H04W 36/0061 455/444 |
| 2014/0141785 A1 | 5/2014 | Wang et al. | |

OTHER PUBLICATIONS

Alcatel-Lucent. Discussion on UE based speed estimation for improving the mobility performance in HetNets. 3GPP Draft; R2-131057, 3rd Generation Partnership Project (3GPP), Mobile Competence Centre ; 650, Route Des Lucioles ; F-06921 vol. RAN WG2, no. Chicagot USA; Apr. 6, 2013.

* cited by examiner

HANDOVER CONTROL METHOD AND APPARATUS FOR HIGH SPEED MOBILITY USER EQUIPMENT

CROSS REFERENCE TO RELATED APPLICATIONS

This non-provisional application claims the priority benefit of U.S. Provisional Application Ser. No. 61/830,251, filed on Jun. 3, 2013, which is hereby incorporated by reference herein in its entirety, including all references cited therein.

TECHNICAL FIELD

This disclosure relates generally to hierarchical radio access networks and User Equipments (UEs). More particularly, but not by way of limitation, the disclosure is related to handover control methods and systems that govern how a UE performs handover or re-selection operations within a hierarchical radio access network.

BACKGROUND

To improve network traffic, hierarchical radio access networks often include both macrocells and small cells that service areas that service portions of the macrocells. The small cells can extend the reach of the hierarchical radio access network. The small cells are frequently positioned in areas where signal strength of a macrocell is poor or where data traffic demand is high. The small cells may provide UEs with higher quality radio network access compared with the macrocell.

A hierarchical radio access network may include many small cells that each services a limited geographical area. These small cells are positioned within the coverage area of a macrocell. A network operator can flexibly install small cells in places that require higher data traffic capacity.

When a UE moves into the coverage area of a small cell, the UE performs a handover operation from the macrocell (or another small cell) and thus offloads some traffic from the macrocell to the small cell. Thus, the number of supported, active UEs in the coverage increases and the overall data traffic capacity for the area is also increased.

Offloading some traffic to a small cell provides a benefit to the operator, but these processes are not without drawbacks. A small cell typically includes a small cellular base station that covers only a small geographical area, as mentioned above. For example, a typical small cell range may be 200 meters wide or less compared with a typical macrocell having a typical range (broadcast area) that is a of couple of kilometers wide.

A small cell may operate identically to the macrocell with the exception that the coverage area of the small cell is smaller than that of the macrocell, so the transmission power of the small cell is also lower compared to the macrocell. A UE close to the coverage area of a small cell may detect that a channel quality of the small cell is better than the macrocell. Based on the existing handover mechanism, the UE reports a signal strength measurement report to the network, and the network determines whether the small cell is a better candidate for the UE than the macrocell. If so, the network then performs a handover of the UE to the small cell.

SUMMARY

A problem arises when a high rate of speed of a UE makes it likely that the UE will traverse through a small cell so quickly that a successful handover is difficult or impossible. Due to the high rate of speed of the UE, the UE and/or the network is unable to successfully complete handover operations that transfer the UE from a macrocell to a small cell, or from one small cell to a neighboring small cell. Such incomplete handover processes waste network resources, for example, by requiring base stations to process handover requests that cannot be fulfilled because the UE has already left the coverage area for which the handover request was submitted. Reducing or eliminating these incomplete handover processes can improve overall network performance.

According to some embodiments, the present disclosure is directed to a handover control apparatus and method in a hierarchical radio access network. The network includes a plurality of macrocells overlying a plurality of small cells. A User Equipment (UE) operating in the network connects to either a small cell or an overlying macrocell.

In one embodiment, the present disclosure is directed to a handover control apparatus in a hierarchical radio access network. The network includes a plurality of macrocells overlying a plurality of small cells, and a User Equipment (UE) operating in the network connects to either a small cell or an overlying macrocell. The apparatus includes a transmitter configured to transmit a message to the UE operating within the radio access network; and a processor-controlled message-populating unit configured to populate the message with High Speed Mobility (HSM)-related parameters. The HSM-related parameters include an HSM indicator parameter indicating that the message includes the HSM-related parameters; and an HSM pilot strength threshold offset parameter for controlling handover of the UE from the overlying macrocell to the small cell when a speed of the UE causes the UE to operate in an HSM mode. The HSM pilot strength threshold offset parameter is utilized in addition to a normal pilot strength threshold offset parameter to limit handover of the UE to the small cell when the UE is operating in the HSM mode.

In some embodiments, the normal pilot strength threshold offset parameter is an exit parameter for the macrocell, and the HSM pilot strength threshold offset parameter is subtracted from the normal pilot strength threshold offset parameter of the macrocell to provide a lower pilot strength threshold offset parameter for triggering handover from the macrocell.

In other embodiments, the normal pilot strength threshold offset parameter is an entry parameter for the small cell, and the HSM pilot strength threshold offset parameter is added to the normal pilot strength threshold offset parameter of the small cell to provide a higher pilot strength threshold offset parameter for triggering handover to the small cell. The HSM pilot strength threshold offset parameter may be the same for all small cells in the network, or it may vary for different small cells in the network. The HSM pilot strength threshold offset parameter may also be the same for all UEs operating in the network, or it may vary for different UEs operating in the network.

In some embodiments, the HSM parameters include at least one parameter identifying which cells in the network are small cells.

In another embodiment, the present disclosure is directed to a UE that includes a processor and a memory for storing executable instructions. The processor is configured to execute the instructions to initiate handover from a macrocell to a small cell within a hierarchical radio access network using a first pilot strength threshold value when the UE is operating in a standard mode. When the UE is operating in the HSM mode, the UE initiates handover from the macrocell to the small cell using a second pilot strength threshold value. The second pilot strength threshold value is equal to the first pilot strength threshold value modified by an HSM pilot strength threshold offset parameter that limits handover of the UE from the macrocell to the small cell.

In another embodiment, the present disclosure is directed to a method executed within a UE. The method includes initiating handover from a macrocell to a small cell within a hierarchical radio access network using a first pilot strength threshold value when the UE is operating in a standard mode; and initiating handover from the macrocell to the small cell using a second pilot strength threshold value when the UE is operating in the HSM mode. The second pilot strength threshold value is equal to the first pilot strength threshold value modified by an HSM pilot strength threshold offset parameter that limits handover of the UE from the macrocell to the small cell when the UE is operating in the HSM mode.

BRIEF DESCRIPTION OF THE DRAWINGS

Certain embodiments of the present disclosure are illustrated by the accompanying figures in which.

DETAILED DESCRIPTION

While the present disclosure is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Figure 1A:
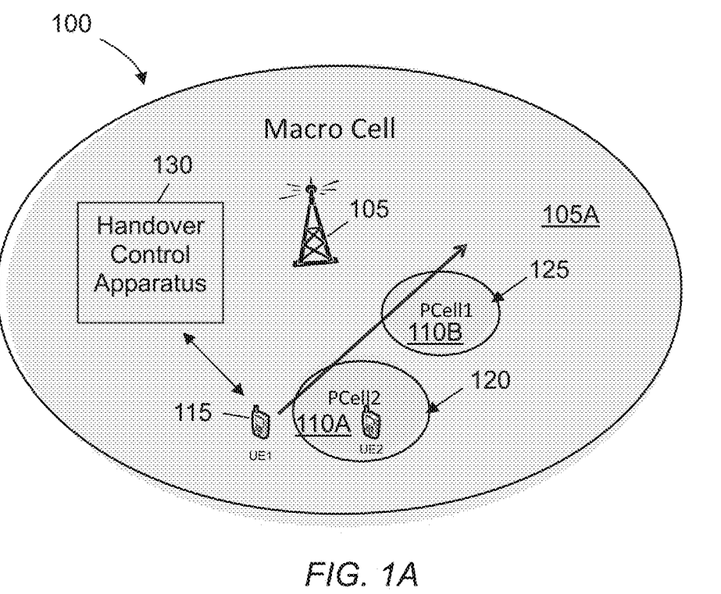
FIG. 1A is a schematic diagram of a hierarchical radio access network suitable for implementing the disclosed solution.
Figure 1B:
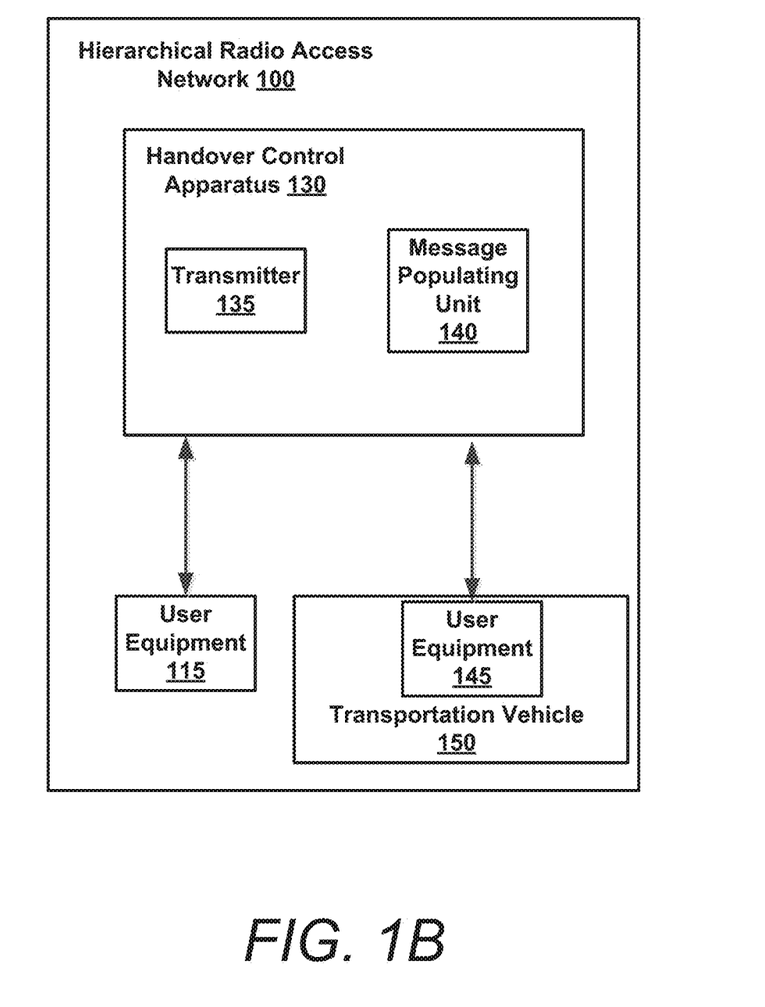
FIG. 1B is a schematic diagram of a handover control apparatus of the hierarchical radio access network of FIG. 1A.

Referring now to FIG. 1, the proposed solution is related to any radio access technology (RAT) that implements a hierarchical radio access network including macrocells and underlying small cells. In an implementation utilizing heterogeneous network (HetNet) deployment, the small cells may utilize different access technology than the macrocells. The RAT types may include 3GPP Long Term Evolution (LTE), Evolved Universal Mobile Telecommunications System (UMTS) Terrestrial Radio Access Network (E-UTRAN), Code Division Multiple Access (CDMA), Wideband Code Division Multiple Access (WCDMA), or other RAT type that would be known to one of ordinary skill in the art with the present disclosure before them. The hierarchical network 100 may include a macrocell 105, and a plurality of underlying small cells, such as small cells 110A and 110B. The hierarchical network 100 also includes a handover control apparatus 130, which will be described in greater detail below with reference to FIG. 1B.

Generally, the macrocell 105 services a coverage area 105A that overlays the small cells 110A and 110B, which service limited geographical areas. For example, small cell 110A services area 120 and small cell 110B services area 125. The hierarchical network 100 may include any number of small cells. Non-limiting examples of small cells include microcells, picocells, femtocells, and the like.

The hierarchical network 100 services a plurality of User Equipments (UEs) such as UE 115. The UE 115 may be any device, such as a cellular telephone or a wireless communications module that is embedded into, for example, a machine-to-machine (M2M) device, that is configured to use a radio access network. For example, a wireless communications module may be embedded in a vehicle or airplane. The UE 115 may be any other wireless communications device that would be known to one of ordinary skill in the art with the present disclosure before them.

Figure 6:
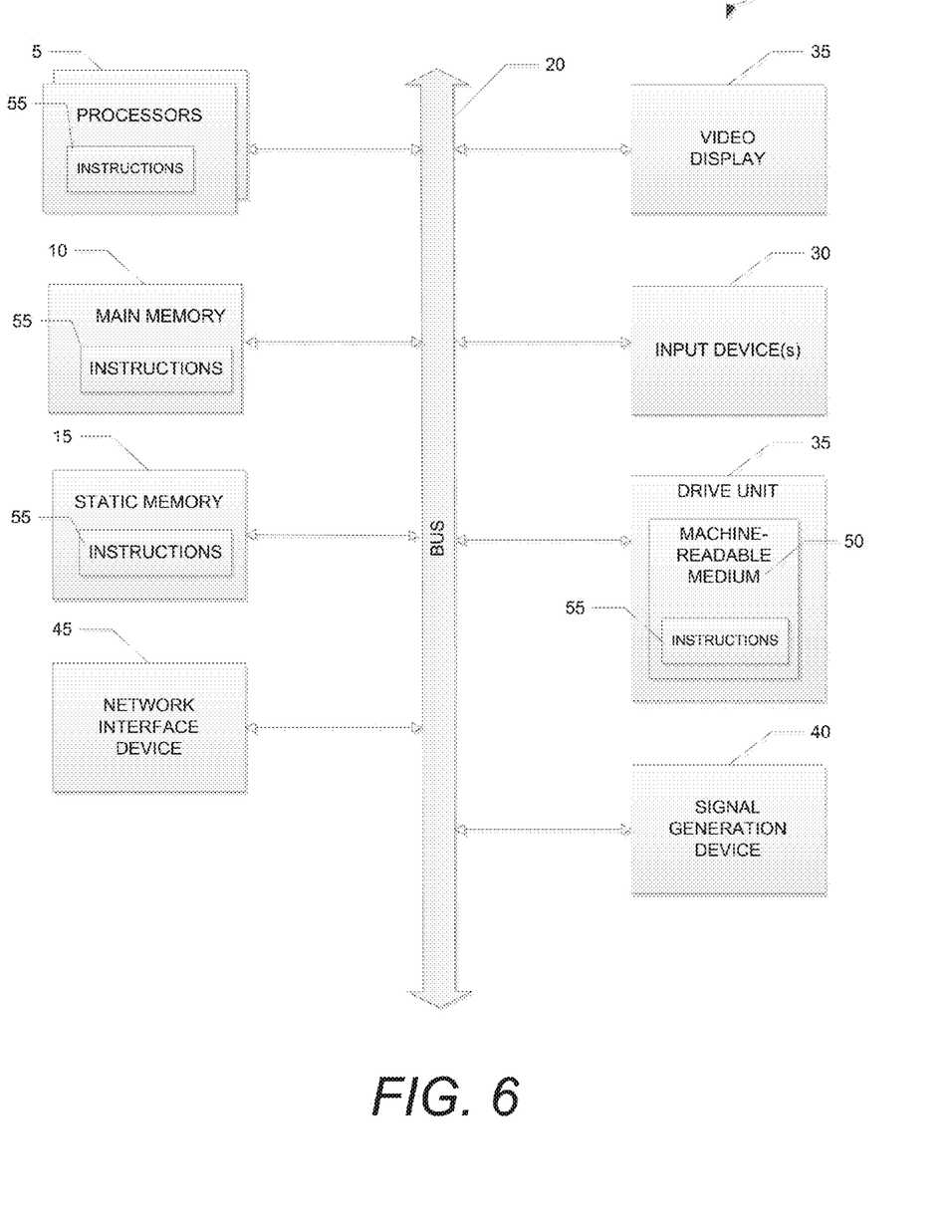
FIG. 6 is a schematic diagram of a computing system that is used to implement embodiments according to the disclosed solution.

The UE 115 may be generally described as a computing system, such as the computing system 1 of FIG. 6, although the UE 115 is programmed with instructions to perform as a specific or special purpose computing device that can determine whether the UE 115 should operate in a High Speed Mobility (HSM) mode or a standard mode. Additional details regarding the ability of the UE 115 to operate in HSM or standard modes will be provided in greater detail below.

As the UE 115 traverses through the coverage area 105A, entering and exiting one or more of the limited geographical areas of the small cells 110A and 110B, the UE 115 may handover between the macrocell 105 and one or more of the small cells 110A and 110B in which the UE 115 is currently located. For context, a UE 115 continually or periodically samples signal strengths of network cells that are adjacent to the UE 115, whether the cells are macro or small. Typically, the UE measures the signal strength of pilot signals transmitted by the UE's serving cell and by base stations for each adjacent or neighboring cell that is proximate the UE 115. When the signal strength of the UE's serving cell falls below a normal pilot strength threshold offset level, the UE 115 will select whichever adjacent cell has the highest signal strength. This normal pilot strength threshold offset parameter (also referred to herein as a first pilot strength offset) is encoded into an overhead message received by the UE 115 from the network.

The methods and apparatuses of the present technology adjust this typical UE handover behavior by introducing a new parameter, referred to as an HSM pilot strength threshold offset parameter. This HSM pilot strength threshold offset parameter modifies the normal pilot strength threshold offset parameter to create a second pilot strength threshold value. The normal pilot strength threshold parameter may relate to either the pilot signal strength of the macrocell or to the pilot signal strength of the small cell. When the normal pilot strength threshold parameter relates to the pilot signal strength of the macrocell, it defines a level at which the UE triggers handover from the macrocell (105). In this case, the UE is configured to subtract the HSM pilot strength threshold offset parameter from the normal pilot strength threshold value to obtain the second pilot strength threshold value, which is lower than the normal pilot strength threshold value for triggering handover from the macrocell. When the normal pilot strength threshold parameter relates to the pilot signal strength of the small cell, it defines a level at which the UE triggers handover to the small cell (105). In this case, the UE is configured to add the HSM pilot strength threshold offset parameter to the normal pilot strength threshold value to obtain the second pilot strength threshold value, which is higher than the normal pilot strength threshold value for triggering handover to the small cell.

Thus, in either case, the UE 115 will tend to remain connected to the macrocell 105 when the UE 115 is in HSM mode and using the second pilot strength threshold value.

In accordance with the present technology, the handover behavior of the UE 115 is governed by whether the UE 115 is operating in HSM mode or standard mode. HSM mode is defined as an operating behavior for a UE, specifically when the UE is moving at a high rate of speed or experiencing a high rate of handovers. The standard mode of operation is defined by a UE that is moving at a slow rate of speed. For context, the rate of speed relates to the likelihood that the UE will traverse through a small cell so as to make a handover difficult or impossible. For example, the UE 115 may be moving at a high rate of speed through small cell 110A and small cell 110B. Due to the high rate of speed of the UE 115, the UE 115 is unable to successfully complete handover operations that transfer the UE 115 from the macrocell 105 to a small cell, or also from one small cell to a neighboring small cell. Thus, the rate of speed is at least partially related by the size of the small cell.

Also, incomplete handover processes waste network resources, for example, by requiring base stations to process handover requests that cannot be fulfilled because the UE has already left the coverage area for which the handover request was submitted. Reducing or eliminating these incomplete handover processes can improve overall network performance.

In accordance with the present disclosure, the UE 115 can be statically provisioned or dynamically provisioned for HSM operation. In an example, the UE 115 can be statically provisioned due to the UE 115 being configured to receive a user input command to switch the UE 115 to or from the HSM mode. For example, the UE 115 may provide a user interface by which a user can input command to switch the UE 115 from HSM mode to standard mode, and vice-versa. The UE 115 may also be statically provisioned by provisioning the second pilot strength threshold value into the UE 115. For example, when the UE 115 is embedded in a transportation device, such as a vehicle or airplane the manufacturer of the UE 115 may pre-provision the UE 115 with a second pilot strength threshold value. When a UE embedded in a vehicle is pre-provisioned for the HSM mode, the network may not need to transmit the HSM-related parameters to the UE since the UE automatically functions in this mode. If the network broadcasts the HSM-related parameters to all UEs operating in the network, any UE pre-provisioned with the second pilot strength threshold value may ignore the broadcast parameters. Alternatively, HSM-related parameters broadcast or unicast by the network may overwrite the pre-provisioned HSM-related parameters in the UE.

In another example, an application server (such as the handover control apparatus 130 of FIG. 1B) or remote sensor may cause the UE 115 to switch to HSM mode when necessary, for example, using a short range RF device (e.g. Bluetooth) or through another over the air (OTA) method. For example, when a user of a UE 115 is boarding a train, a short range transmitter at a train station platform may provide HSM mode information (SI) to the UE 115 and cause UE 115 to set to HSM mode internally.

Correspondingly, when the UE 115 passes through an exit at the platform, the UE 115 will exit HSM mode based on detection of another short range signal at the exit gate.

In accordance with the present disclosure, the UE 115 may perform one or more methods for determining whether the UE 115 should operate in HSM mode or standard mode. When the UE 115 determines that it should operate in HSM mode, the UE 115 is configured to mark itself as being in HSM mode. For example, the UE 115 may create an internal parameter or indicator that identifies that the UE 115 is in HSM mode. The UE 115 can limit itself from performing handover operations to small cells using one or more system information (SI) parameters that are received from the hierarchical network 100. The SI parameters will be described in greater detail below with reference to the operation of a handover control apparatus 130 of FIG. 1B.

In some embodiments, the UE 115 is configured to operate in both a standard mode and HSM mode. The UE 115 can, in these instances, using dynamic provisioning, where the UE 115 selectively places itself into HSM mode when needed. The UE 115 typically places itself in HSM mode when the UE 115 is moving at a high rate of speed. The UE 115 may utilize two methods or processes for dynamic provisioning for determining a rate of speed of the UE 115, and ultimately determining whether to place itself in standard or HSM mode.

Figure 4:
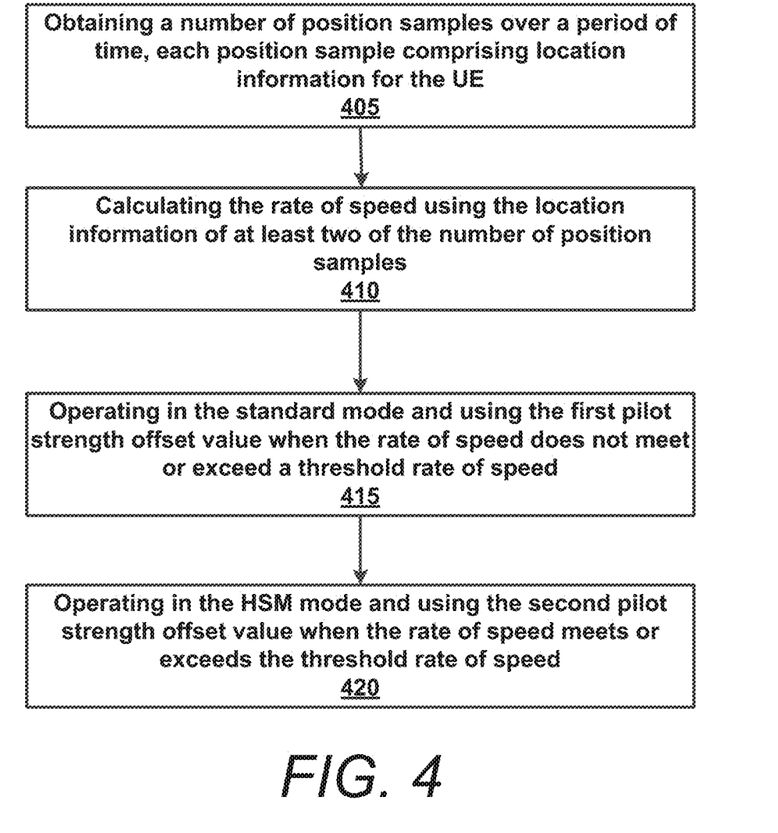
FIG. 4 is a flow chart of a method executed by a UE to determine whether it should operate in a HSM mode by using position samples that enable determination of a rate of speed for the UE.

Referring now to FIGS. 1A and 4 collectively, in a first method of dynamic provisioning, the method initially includes the UE 115 storing 605 historical information of handovers or cell-reselections. This method includes the UE 115 obtaining 405 a number of position samples over a period of time, each position sample comprising location information for the UE 115. Also, the method includes the UE 115 calculating 410 a rate of speed of the UE 115 using the location information of at least two of the number of position samples. For example, the UE 115 can calculate velocity (e.g., rate of speed) using a first position and a second position by determining a distance between the first and second positions. Also, the UE 115 calculates a time delta of how long it took the UE 115 to traverse the calculated distance. The UE 115 can compare this velocity value to a threshold to determining whether the UE 115 should operate in HSM or standard mode.

In one embodiment the method includes the UE 115 operating 415 in the standard mode and using the first pilot strength threshold value when the rate of speed does not meet or exceed a threshold rate of speed. Alternatively, the method includes the UE 115 operating 420 in the HSM mode and using the second pilot strength threshold value when the rate of speed meets or exceeds the threshold rate of speed.

Figure 5:
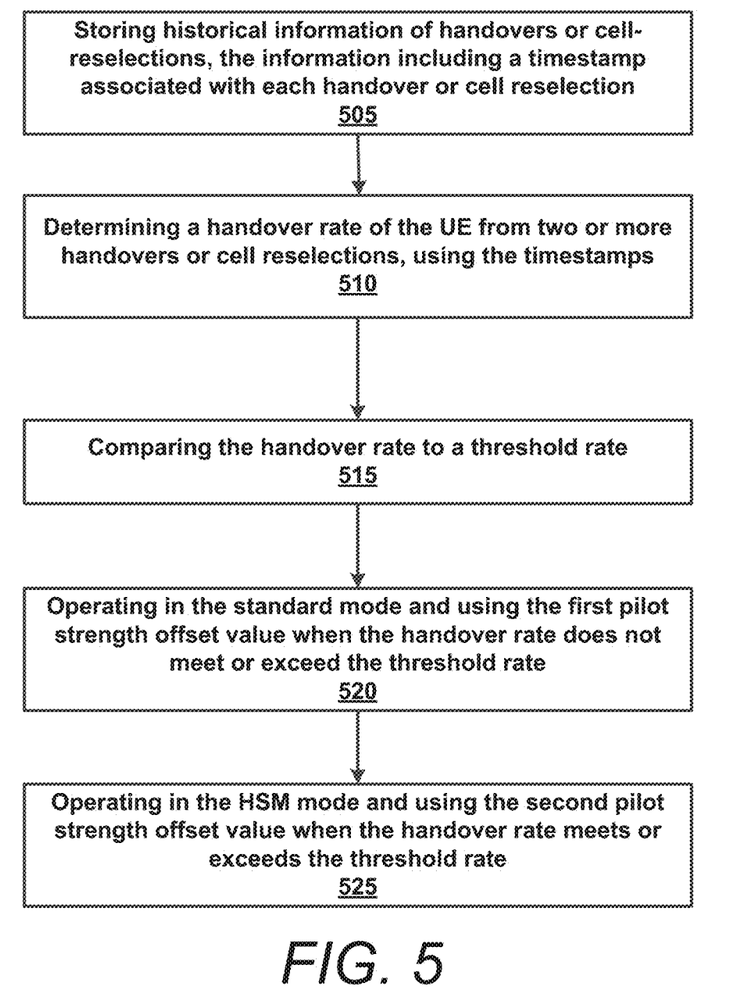
FIG. 5 is a flow chart of a method executed by a UE to determine whether it should operate in a HSM mode by using handovers or cell-re-selections that enable determination of a rate of speed for the UE.

Referring now to FIGS. 1A and 5 collectively, in a second method of dynamic provisioning, the method initially includes the UE 115 storing 505 historical information of handovers or cell-reselections. The historical information includes a timestamp associated with each handover or cell reselection. These handovers or cell-reselections are preferably the most recent handovers or cell reselections. The UE 115 determines 510 a handover rate from two or more handovers or cell reselections, using the timestamps. For example, the UE 115 may have two recent handover requests that were within one minute of one another. This may indicate that the UE 115 is moving at a high rate of speed, particularly when the time stamps between these two recent handover requests have a time delta that is smaller in size compared to other time deltas between other prior handover or cell-reselection events.

For example, prior handover or cell-reselection events for the UE 115 occurring within the last hour indicate that the UE 115 is has experienced time deltas of four to five minutes in duration.

In one embodiment, the method includes the UE 115 comparing 515 the handover rate to a threshold rate. The method further includes the UE 115 operating 520 in the standard mode and using the first pilot strength offset value when the handover rate does not meet or exceed the threshold rate. Alternatively, the method includes the UE 115 operating 525 operating in the HSM mode and using the second pilot strength offset value when the handover rate meets or exceeds the threshold rate.

In one example, the UE 115 is a cellular telephone that is located within a vehicle that is traveling at a high rate of speed. Because the UE 115 is traveling at a high rate of speed, the UE 115 places itself into HSM mode which allows the UE 115 to utilize the HSM pilot strength threshold offset parameter to make handover decisions.

In addition to UE mode determination, the present technology also provides network components that are configured to provide the UE 115 with system information (SI) parameters. For example, FIGS. 1A and 1B each illustrate the use of a handover control apparatus 130 that transmits SI parameters to the UE 115. FIG. 1B illustrates that the apparatus 130 includes at least a transmitter 135 and a processor-controlled message populating unit 140. The apparatus 130 may include other computing or network components that would be known to one of ordinary skill in the art. For example, the apparatus 130 can include any one or more of the components of FIG. 6, such as a processor and memory.

In some embodiments, the transmitter 135 is configured to broadcast to UEs operating within the radio access network, an overhead message that includes SI parameters. The message-populating unit 140 is configured to populate the overhead message with the SI parameters. Examples of SI parameters may include a High Speed Mobility (HSM) indicator parameter indicating that the overhead message includes HSM-related parameters. The HSM-related parameters include the HSM pilot strength threshold offset parameter. The HSM pilot strength threshold offset parameter is used by the UE 115 to control handover of the UE 115 from the overlying macrocell 105 to a small cell when a speed of the UE 115 causes the UE 115 to operate in an HSM mode.

Rather than broadcasting the HSM related parameters (e.g., special offset value for HSM mode, small cell neighbors) to UEs, such information may be unicast to individual UEs through other means such as a unicast signaling message or other over-the-air-provisioning method.

According to some embodiments, different HSM pilot strength threshold offset parameters may be used for different small cells and/or different UEs. For example, each small cell in a hierarchical network may require unique HSM-related parameters, and specifically unique HSM pilot strength threshold offset parameters for each small cell. For example, when a small cell has a limited coverage area that is relatively large (e.g., a micro or pico cell), the small cell may be associated with a unique HSM pilot strength threshold offset parameter that is smaller compared with a small cell has a more limited coverage area that is relatively small (e.g., a femto cell). Thus, it might be easier for the UE to handover to the small cell with the larger coverage area, because it is more likely that the UE can accomplish a successful handover operation before it leaves the larger coverage area. In other embodiments, the same HSM pilot strength threshold offset parameter may be used for all small cells. Likewise, the speed of the UE can vary greatly, and thus different UEs traveling at different speeds require unique HSM-related parameters.

The processor-controlled message-populating unit 140 may also be configured to populate the overhead message with at least one HSM parameter identifying which cells in the network are small cells. For example, the message-populating unit 140 may cause the transmitter 135 to broadcast a neighbor cell list in a cell-reselection parameter messages such as SIB4/SIB5 messages, when the network is an LTE network. When the network is a High Rate Packet Data (HRPD) network the message-populating unit 140 may use a SectorParameters/NeighborList overhead message. These methods for cell identification are important in embodiments where the network does not have a means to provide distinctions between macrocells and small cells in the network. Thus, there is a need to provide such information to the UE 115 so that the UE 115 can make the decision whether it should perform a handover to a small cell or remain associated with the macrocell 105.

In another example, an Access Network Discovery and Selection Function (ANDSF) of a 3GPP network may be used to inform the UE 115 which neighboring cells are small cells.

Figure 2A:
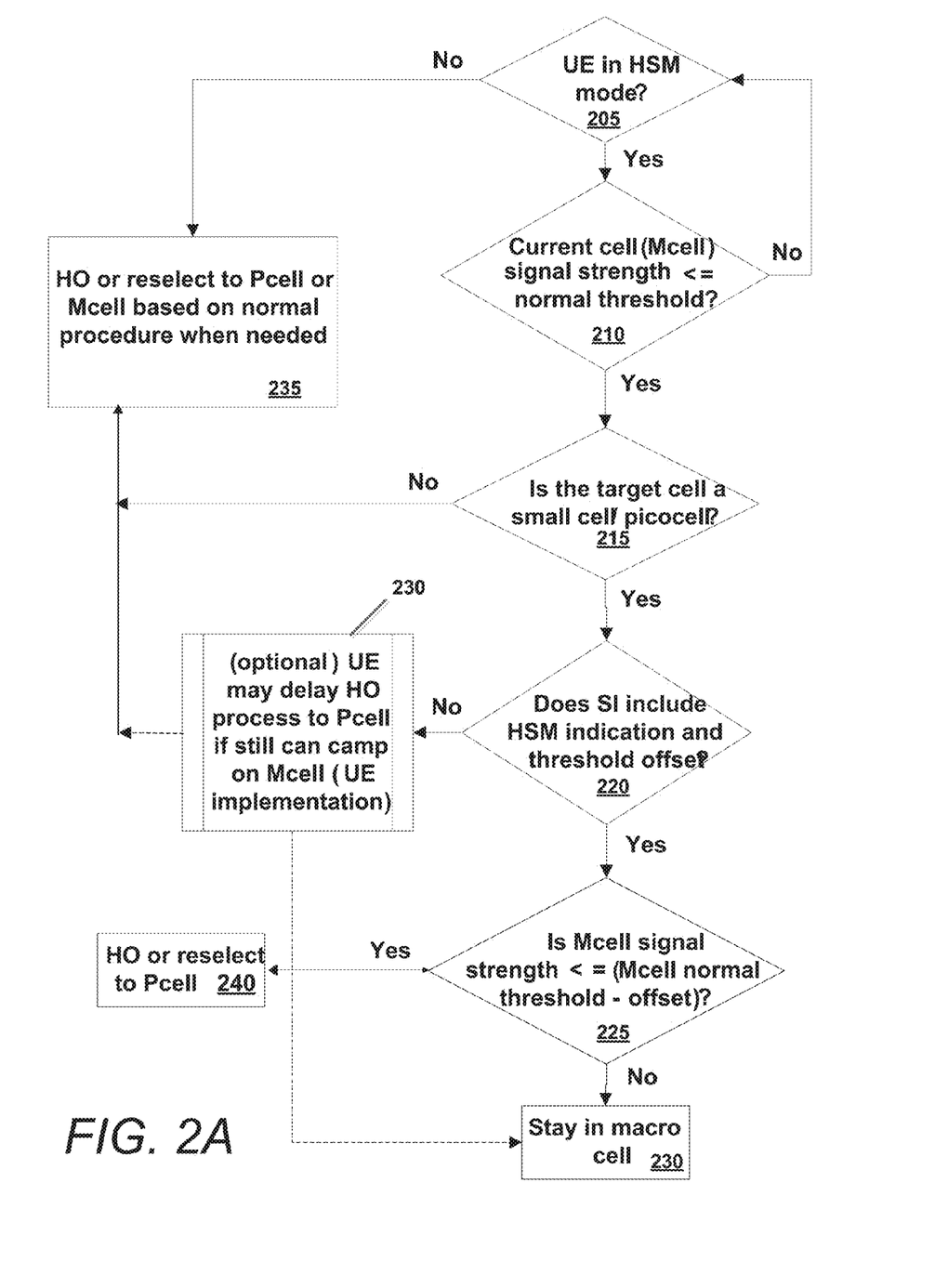
FIG. 2A illustrates a flow chart of a first exemplary embodiment of a method performed by a UE of the present technology.

FIG. 2A illustrates a flow chart of a first exemplary embodiment of a method performed by a UE 115 of the present technology to determine whether the UE should handover from a macrocell to a small cell, or reselect the small cell. In the embodiment of FIG. 2A, it is understood that the HSM pilot strength threshold offset parameter modifies the normal pilot strength threshold offset parameter of a serving macrocell and thus is an exit parameter for the macrocell.

The method includes an initial step 205 of the UE 115 determining whether it is in HSM mode. When the UE is not in HSM mode, typically because it is not moving at a rate of speed that requires HSM mode operation, the UE routes to step 235 and uses a "normal" handover or reselection procedure. When the UE is operating in HSM mode, the UE routes to step 210 where the UE compares a signal strength for the macrocell to a normal pilot strength threshold offset parameter. When the macrocell signal strength is greater than the normal pilot strength threshold offset parameter, the UE returns to step 205 and continues to monitor whether it is in the HSM mode. When the macrocell signal strength is less than or equal to the normal pilot strength threshold offset parameter, the UE routes to step 215 and determines whether an identified target cell is a small cell. If not, the UE routes to step 235 and uses the normal handover or reselection procedure. Conversely, when the target cell is a small cell, the UE routes to step 220 where the UE 115 determines whether a base station (for example a handover control apparatus 130 of FIG. 1B) is broadcasting an overhead message that includes an HSM indication and HSM parameters that include a HSM pilot strength threshold offset parameter. If not, the UE may route to step 230, which optionally allows the UE to delay execution of a handover from the macrocell to a small cell when the UE can stay connected or camp on the macrocell.

When the base station is broadcasting the overhead message with the HSM parameters, the UE operating in HSM mode may route to step 225 where the UE determines whether the signal strength of the macrocell is less than, or equal to, the normal pilot strength threshold offset parameter minus the HSM pilot strength threshold offset parameter. If not, the UE routes to step 230 and remains connected to the macrocell. However, when the signal strength of the macrocell is less than, or equal to, the normal pilot strength threshold offset parameter minus the HSM pilot strength threshold offset parameter, the UE routes to step 240 and the UE hands over to or reselects the small cell.

Figure 2B:
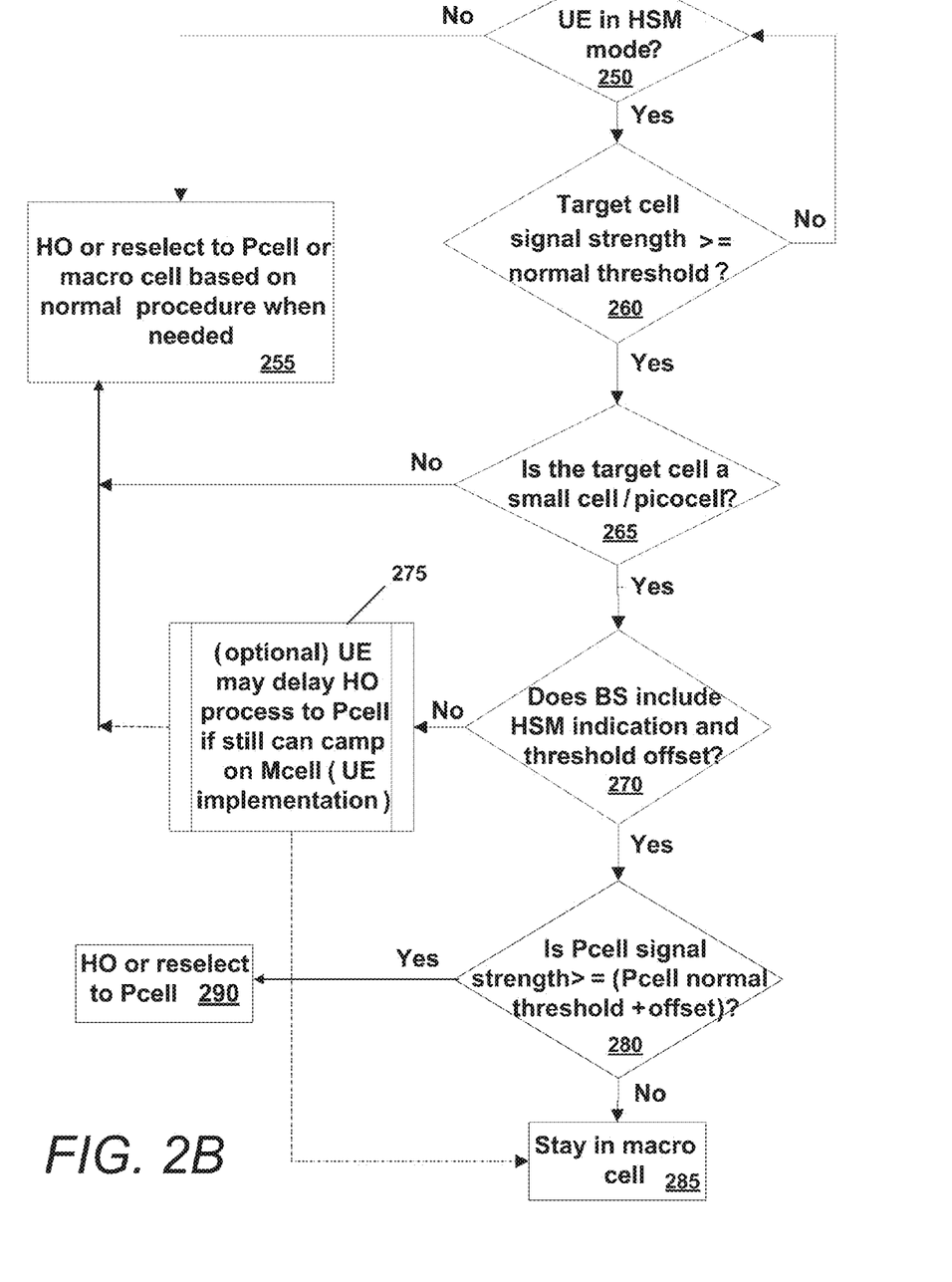
FIG. 2B illustrates a flow chart of a second exemplary embodiment of a method performed by a UE of the present technology.

FIG. 2B illustrates a flow chart of a second exemplary embodiment of a method performed by a UE 115 of the present technology to determine whether the UE should handover from a macrocell to a small cell, or reselect the small cell. In the embodiment of FIG. 2B, it is understood that the HSM pilot strength threshold offset parameter modifies the normal pilot strength threshold offset parameter of a target small cell and thus is an entry parameter for the small cell.

The method includes an initial step 250 of the UE 115 determining whether it is in HSM mode. When the UE is not in HSM mode, typically because it is not moving at a rate of speed that requires HSM mode operation, the UE routes to step 255 and uses a "normal" handover or reselection procedure. When the UE is operating in HSM mode, the UE routes to step 260 where the UE compares a signal strength for the target cell to a normal pilot strength threshold offset parameter for the target cell. When the target cell signal strength is less than the normal pilot strength threshold offset parameter, the UE returns to step 250 and continues to monitor whether it is in the HSM mode. When the target cell signal strength is greater than or equal to the normal pilot strength threshold offset parameter, the UE routes to step 265 and determines whether the target cell is a small cell/picocell (Pcell). If not, the UE routes to step 255 and uses the normal handover or reselection procedure. Conversely, when the target cell is a small cell, the UE routes to step 270 where the UE 115 determines whether a base station (for example a handover control apparatus 130 of FIG. 1B) is broadcasting an overhead message that includes an HSM indication and HSM parameters that include a HSM pilot strength threshold offset parameter. If not, the UE may route to step 275, which optionally allows the UE to delay execution of a handover from the macrocell to a small cell when the UE can stay connected or camp on the macrocell.

When the base station is broadcasting the overhead message with the HSM parameters, the UE operating in HSM mode may route to step 280 where the UE determines whether the signal strength of the small cell is greater than, or equal to, the normal pilot strength threshold offset parameter plus the HSM pilot strength threshold offset parameter. If not, the UE routes to step 285 and remains connected to the macrocell. However, when the signal strength of the small cell is greater than, or equal to, the normal pilot strength threshold offset parameter plus the HSM pilot strength threshold offset parameter, the UE routes to step 290 and the UE hands over to or reselects the small cell.

It should be understood that even though the it is determined the UE can handover to the small cell, the procedures to perform the handover depend on the underlying radio technology. For example, in LTE, when the UE is idle mode, the UE performs the cell reselection procedure by itself. However, if the UE is in active mode, the UE report the measured neighbor pilot strength information to the network, which makes the handover decision.

Figure 3:
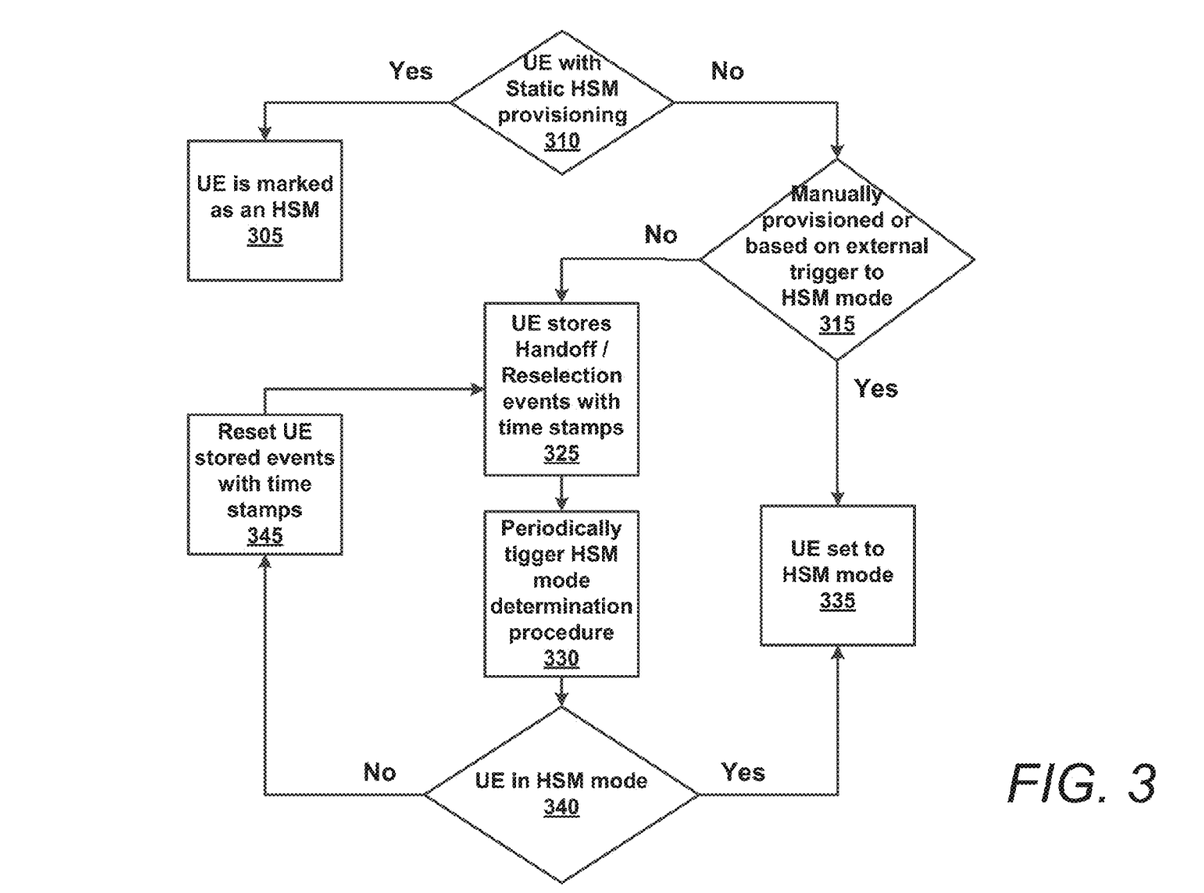
FIG. 3 is a flow chart of various methods by which a UE is able to determine whether it is a high speed mobility (HSM) device and whether the UE should place itself into HSM mode.

FIG. 3 is a flow chart of various procedures by which a UE may determine whether it should operate in a standard mode or a HSM mode. For example, when the UE is statically provisioned at step 310, it will always mark itself as an HSM device and operate as such in step 305. When the UE is not statically provisioned, it will determine whether it can be manually provisioned in step 315. Again, the UE may be triggered to operate in HSM by user input or by network request, as mentioned above.

When the UE is provisioned to operate in HSM mode and the network has provided the UE with SI parameters that includes a HSM pilot strength threshold offset parameter, the UE may set itself to HSM mode in step 335. When the UE is not manually provisioned, it can be dynamically provisioned by routing to step 325 where the UE stores handover or reselection events with time stamps. As mentioned above, in other instances the UE uses position and time information rather than handover or reselection event data.

The UE is configured to periodically trigger an HSM mode determination procedure 330. The UE can then determine in step 340 whether the UE should be placed into HSM mode. When the UE should be placed in HSM mode, the method includes the UE setting itself in HSM mode in step 335. When the UE is not to be placed in HSM mode, the UE may reset UE stored events, such as handover or reselection events with time stamps in step 345. The UE can also purge the handover or reselection events with time stamps after the UE is set to HSM mode. The UE routes back to step 325 to begin again the process of storing handover or reselection events with time stamps.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a UE or a base station, NodeB, or eNodeB capable of executing a set of instructions (sequential or otherwise) that specify actions to be taken by that machine.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 35 (also referred to as disk drive unit), a signal generation device 40 (e.g., a speaker), and a network interface device 45. The computer system 1 may further include a data encryption module (not shown) to encrypt data.

The disk drive unit 35 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network 140 via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A handover control apparatus in a hierarchical radio access network, the network having a plurality of macrocells overlying a plurality of small cells, wherein a User Equipment (UE) operating in the network connects to either a small cell or an overlying macrocell, the apparatus comprising:
   a transmitter configured to transmit a message to the UE operating within the radio access network;
   a processor-controlled message-populating unit configured to populate the message with High Speed Mobility (HSM)-related parameters, wherein the HSM-related parameters include:
      an HSM indicator parameter indicating that the message includes the HSM-related parameters; and
      an HSM pilot strength threshold offset parameter for controlling handover of the UE from the overlying macrocell to the small cell when a speed of the UE causes the UE to operate in an HSM mode, wherein the HSM pilot strength threshold offset parameter is utilized in addition to a normal pilot strength threshold offset parameter to limit handover of the UE to the small cell when the UE is operating in the HSM mode.

2. The apparatus according to claim 1, wherein the normal pilot strength threshold offset parameter is an exit parameter for the macrocell, and the HSM pilot strength threshold offset parameter is subtracted from the normal pilot strength threshold offset parameter of the macrocell to provide a lower pilot strength threshold offset parameter for triggering handover from the macrocell.

3. The apparatus according to claim 2, wherein when the UE is operating in HSM mode and passes through the small cell while the UE is connected to the macrocell, the UE remains connected to the macrocell when the signal strength of the macrocell is greater than or equal to the macrocell's lower pilot strength threshold offset parameter.

4. The apparatus according to claim 3, wherein the UE in HSM mode initiates handover from the macrocell only when the signal strength of the macrocell is less than the macrocell's lower pilot strength threshold offset parameter.

5. The apparatus according to claim 1, wherein the normal pilot strength threshold offset parameter is an entry parameter for the small cell, and the HSM pilot strength threshold offset parameter is added to the normal pilot strength threshold offset parameter of the small cell to provide a higher pilot strength threshold offset parameter for triggering handover to the small cell.

6. The apparatus according to claim 5, wherein when the UE is operating in HSM mode and passes through the small cell while the UE is connected to the macrocell, the UE remains connected to the macrocell when the signal strength of the small cell is less than or equal to the small cell's higher pilot strength threshold offset parameter.

7. The apparatus according to claim 6, wherein the UE in HSM mode initiates handover to the small cell only when the signal strength of the small cell exceeds the small cell's higher pilot strength threshold offset parameter.

8. The apparatus according to claim 5, wherein the HSM pilot strength threshold offset parameter is the same for all small cells in the network and for all UEs operating in the network.

9. The apparatus according to claim 5, wherein the HSM pilot strength threshold offset parameter varies for different small cells in the network or for different UEs operating in the network.

10. The apparatus according to claim 1, wherein the HSM-related parameters also include at least one parameter identifying which cells in the network are small cells.

11. A User Equipment (UE), comprising:
    a processor; and
    a memory for storing executable instructions, wherein when the processor executes the instructions, the UE is caused to:
        initiate handover from a macrocell to a small cell within a hierarchical radio access network using a first pilot strength threshold value when the UE is operating in a standard mode; and
        initiate handover from the macrocell to the small cell using a second pilot strength threshold value when the UE is operating in a High Speed Mobility (HSM) mode, wherein the second pilot strength threshold value is equal to the first pilot strength threshold value modified by an HSM pilot strength threshold offset parameter that limits handover of the UE from the macrocell to the small cell when the UE is operating in the HSM mode.

12. The UE according to claim 11, wherein the first pilot strength threshold value relates to the pilot signal strength of the macrocell and defines a level at which the UE triggers handover from the macrocell, wherein the UE is configured to subtract the HSM pilot strength threshold offset parameter from the first pilot strength threshold value to obtain the second pilot strength threshold value, which is lower than the first pilot strength threshold value for triggering handover from the macrocell.

13. The UE according to claim 12, wherein when the UE is operating in HSM mode and passes through the small cell while the UE is connected to the macrocell, the UE is configured to remain connected to the macrocell when the signal strength of the macrocell is greater than or equal to the lower, second pilot strength threshold value.

14. The UE according to claim 11, wherein the first pilot strength threshold value relates to the pilot signal strength of the small cell and defines a level at which the UE triggers handover to the small cell, wherein the UE is configured to add the HSM pilot strength threshold offset parameter to the first pilot strength threshold value to obtain the second pilot strength threshold value, which is higher than the first pilot strength threshold value for triggering handover to the small cell.

15. The UE according to claim 14, wherein when the UE is operating in HSM mode and passes through the small cell while the UE is connected to the macrocell, the UE is configured to remain connected to the macrocell when the signal strength of the small cell is less than or equal to the higher, second pilot strength threshold value.

16. The UE according to claim 11, wherein when the UE is embedded in a transportation vehicle, the UE is provisioned with the second pilot strength offset value only.

17. The UE according to claim 11, wherein the UE is configured to determine whether the UE should operate in the HSM mode by:
  storing historical information of handovers or cell-reselections, the information including a timestamp associated with each handover or cell reselection;
  determining a handover rate of the UE from two or more handovers or cell reselections, using the timestamps;
  comparing the handover rate to a threshold rate;
  operating in the standard mode and using the first pilot strength offset value when the handover rate does not meet or exceed the threshold rate; and
  operating in the HSM mode and using the second pilot strength offset value when the handover rate meets or exceeds the threshold rate.

18. The UE according to claim 11, wherein the UE is configured to determine whether the UE should operate in the HSM mode by:
  obtaining a number of position samples over a period of time, each position sample comprising location information for the UE;
  calculating a rate of speed of the UE using the location information of at least two of the number of position samples;
  operating in the standard mode and using the first pilot strength offset value when the rate of speed does not meet or exceed a threshold rate of speed; and
  operating in the HSM mode and using the second pilot strength offset value when the rate of speed meets or exceeds the threshold rate of speed.

19. The UE according to claim 11, wherein the HSM pilot strength threshold offset parameter is the same for all small cells in the network.

20. The UE according to claim 11, wherein the HSM pilot strength threshold offset parameter varies for different small cells in the network.

21. The UE according to claim 11, wherein the UE is configured to receive a user input command to switch the UE to or from the HSM mode.

22. The UE according to claim 11, wherein the UE is configured to receive the HSM pilot strength threshold offset parameter from the network, and a value of the HSM pilot strength threshold offset parameter varies in relation to a speed of the UE.

23. A method executed within a User Equipment (UE), the method comprising:
  initiating handover from a macrocell to a small cell within a hierarchical radio access network using a first pilot strength threshold value when the UE is operating in a standard mode; and
  initiating handover from the macrocell to the small cell using a second pilot strength threshold value when the UE is operating in a High Speed Mobility (HSM) mode, wherein the second pilot strength threshold value is equal to the first pilot strength threshold value modified by an HSM pilot strength threshold offset parameter that limits handover of the UE from the macrocell to the small cell when the UE is operating in the HSM mode.

24. The method according to claim 23, wherein the first pilot strength threshold value relates to the pilot signal strength of the macrocell and defines a level at which the UE triggers handover from the macrocell, wherein the method includes subtracting the HSM pilot strength threshold offset parameter from the first pilot strength threshold value to obtain the second pilot strength threshold value, which is lower than the first pilot strength threshold value for triggering handover from the macrocell.

25. The method according to claim 24, wherein when the UE is operating in HSM mode and passes through the small cell while the UE is connected to the macrocell, the UE remains connected to the macrocell when the signal strength of the macrocell is greater than or equal to the lower, second pilot strength threshold value.

26. The method according to claim 23, wherein the first pilot strength threshold value relates to the pilot signal strength of the small cell and defines a level at which the UE triggers handover to the small cell, wherein the method includes adding the HSM pilot strength threshold offset parameter to the first pilot strength threshold value to obtain the second pilot strength threshold value, which is higher than the first pilot strength threshold value for triggering handover to the small cell.

27. The method according to claim 26, wherein when the UE is operating in HSM mode and passes through the small cell while the UE is connected to the macrocell, the UE remains connected to the macrocell when the signal strength of the small cell is less than or equal to the higher, second pilot strength threshold value.

28. The method according to claim 23, further comprising always utilizing the second pilot strength offset value when the UE is embedded in a transportation vehicle.

29. The method according to claim 23, further comprising utilizing the same HSM pilot strength threshold offset parameter for all small cells in the network.

30. The method according to claim 23, further comprising utilizing different HSM pilot strength threshold offset parameters for different small cells in the network.

31. The method according to claim 23, further comprising receiving the HSM pilot strength threshold offset parameter from the network, wherein a value of the HSM pilot strength threshold offset parameter varies in relation to a speed of the UE.

* * * * *